US009950686B2

(12) United States Patent
Hiraiwa et al.

(10) Patent No.: US 9,950,686 B2
(45) Date of Patent: Apr. 24, 2018

(54) OCCUPANT PROTECTION APPARATUS

(71) Applicant: TOYODA GOSEI CO., LTD., Kiyosu-shi, Aichi-ken (JP)

(72) Inventors: Takuya Hiraiwa, Kiyosu (JP); Koji Kawamura, Kiyosu (JP); Yuji Sato, Kiyosu (JP); Masaaki Okuhara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 52 days.

(21) Appl. No.: 15/271,277

(22) Filed: Sep. 21, 2016

(65) Prior Publication Data

US 2017/0088083 A1    Mar. 30, 2017

(30) Foreign Application Priority Data

Sep. 29, 2015  (JP) ................ 2015-191987

(51) Int. Cl.
| | |
|---|---|
| *B60R 21/232* | (2011.01) |
| *B60R 21/231* | (2011.01) |
| *B60R 21/16* | (2006.01) |
| *B60R 21/2338* | (2011.01) |

(52) U.S. Cl.
CPC ...... *B60R 21/232* (2013.01); *B60R 21/23138* (2013.01); *B60R 2021/161* (2013.01); *B60R 2021/23107* (2013.01); *B60R 2021/23386* (2013.01)

(58) Field of Classification Search
CPC ........... B60R 21/232; B60R 21/23138; B60R 2021/23386; B60R 2021/161; B60R 2021/23107
See application file for complete search history.

(56) References Cited

U.S. PATENT DOCUMENTS

| | | | |
|---|---|---|---|
| 2005/0029781 A1* | 2/2005 | Enders ................. | B60R 21/205 280/732 |
| 2009/0184500 A1* | 7/2009 | Feller ................. | B60R 21/23138 280/730.2 |
| 2009/0243267 A1* | 10/2009 | Fletcher ............... | B60R 21/232 280/730.2 |
| 2013/0200596 A1* | 8/2013 | Goto ..................... | B60R 21/262 280/728.2 |
| 2014/0265271 A1* | 9/2014 | Dinsdale ........... | B60R 21/23138 280/730.2 |

FOREIGN PATENT DOCUMENTS

JP          2013-133049 A       7/2013

* cited by examiner

*Primary Examiner* — Darlene P Condra
(74) *Attorney, Agent, or Firm* — Posz Law Group, PLC

(57) ABSTRACT

An occupant protection apparatus is provided with a first airbag device having a window airbag that protects an occupant in a vehicle and a second airbag device having an adjacent airbag that completes inflation to contact the window airbag for which inflation is completed, thereby protecting the occupant. Where the internal pressure of an inflation chamber at the contact site during contact with the adjacent airbag by the window airbag is P1 and the internal pressure of the adjacent airbag is P2, P1<P2 is satisfied. The wrap amount of the inflation chamber with the adjacent airbag is set as a proportion of a calculated value or less of a predetermined numeric expression.

7 Claims, 7 Drawing Sheets

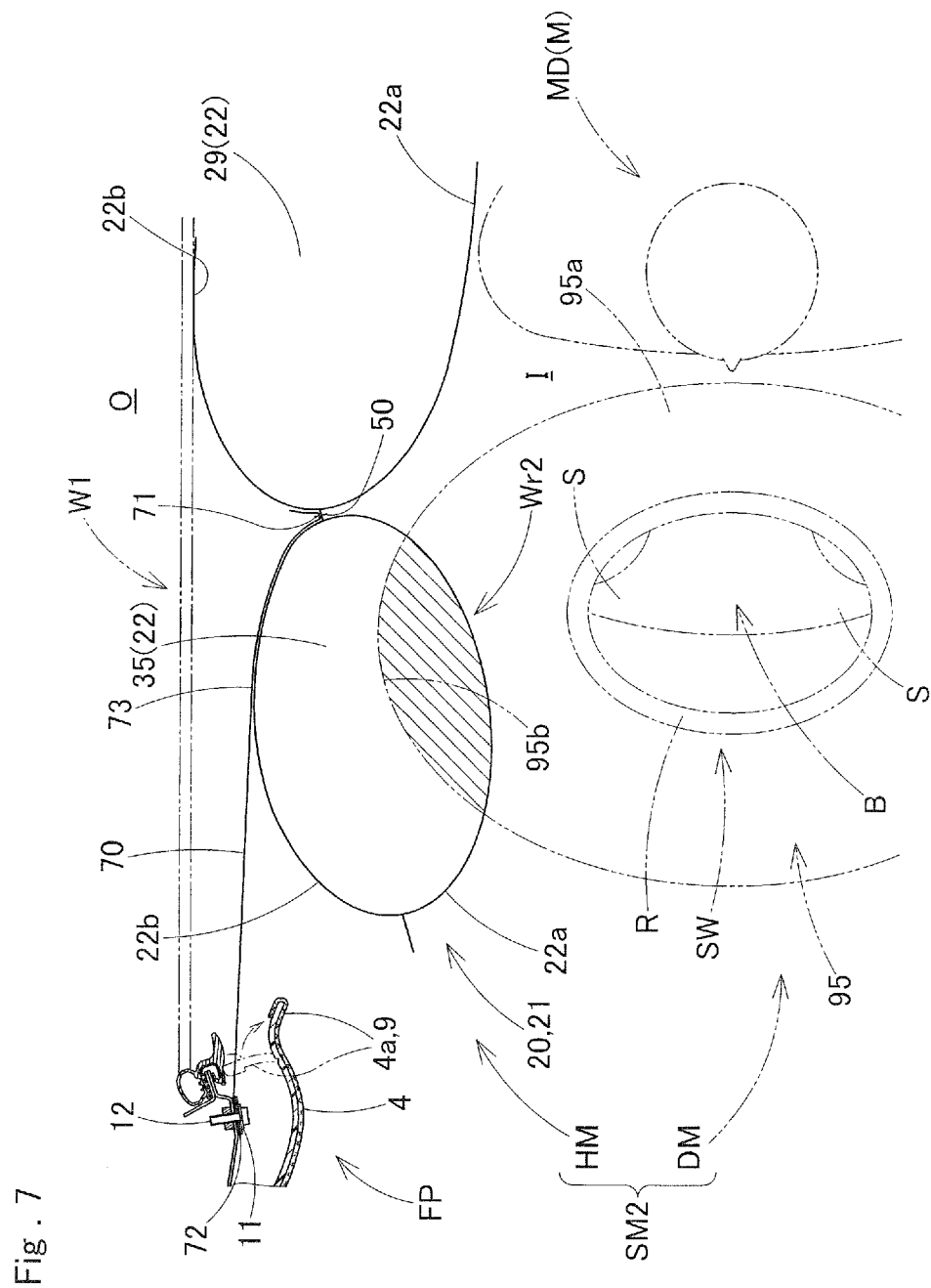

OCCUPANT PROTECTION APPARATUS

CROSS REFERENCE TO RELATED APPLICATIONS

The present application claims priority from Japanese Patent Application No. 2015-191987 of Hiraiwa et al., filed on Sep. 29, 2015, the entire disclosure of which is incorporated herein by reference.

BACKGROUND OF THE INVENTION

1. Field of the Invention

The present invention relates to an occupant protection apparatus provided with a first airbag device having a window airbag that expands and inflates to cover the vehicle inside of a window of a vehicle, thereby protecting an occupant and a second airbag device that is disposed in the vicinity of the first airbag device and has an adjacent airbag that completes inflation to contact the window airbag, thereby protecting the occupant (including a person on board seated in the passenger seat and a driver seated in the driver seat).

2. Description of Related Art

There are occupant protection apparatuses for a vehicle in the related art that are provided with a first airbag device having a window airbag and a passenger seat airbag device as a second airbag device that is provided in the vicinity of the first airbag device and that has an adjacent airbag that completes inflation to come in contact with the window airbag, thereby protecting the occupant (for example, refer to JP-A-2013-133049).

In the occupant protection apparatus of the related art, there are cases where the adjacent airbag of the passenger seat airbag device, that is, the passenger seat airbag completes inflation to contact the window airbag for which inflation is completed. In this case, even though the window airbag ordinarily has a lower internal pressure than the passenger seat airbag, there are cases where the passenger seat airbag shakes so that the receiving surface for the occupant shifts, and a problem arises in suppressing the shaking.

SUMMARY OF THE INVENTION

In order to resolve the above-described problems, it is an object of the invention to provide an occupant protection apparatus capable of favorably suppressing shaking in an adjacent airbag even if a window airbag is inflated coming into contact with the adjacent airbag.

An occupant protection apparatus according to the invention includes a first airbag device including a window airbag that is folded and accommodated on the upper edge side of a window on the vehicle inside of a vehicle, and expands and inflates downward to cover the vehicle inside of the window during inflow of an inflation gas, thereby protecting an occupant, and a second airbag device including an adjacent airbag that is provided in the vicinity of the first airbag device, and that, during operation, protects the occupant by inflation being completed to come in contact with the window airbag for which inflation is completed. The window airbag and the adjacent airbag when inflation is completed are set satisfying the following conditions. That is, first, as condition A, P1<P2 is satisfied where the internal pressure of the inflation chamber at the contact site during contact with the adjacent airbag of the window airbag is P1, and the internal pressure of the adjacent airbag during contact with the inflation chamber is P2. As condition B, the wrap amount of the inflation chamber with the adjacent airbag is [1−{(atmospheric pressure+P1)/(atmospheric pressure+P2)}] #times 100 (%) or less, within a range in which the contact state between with the adjacent airbag of the window airbag is maintained.

That is, if the internal pressure P2 of the adjacent airbag during contact is higher than the internal pressure P1 of the inflation chamber at the contact site during contact with the adjacent airbag in the window airbag, basically, it is difficult for the adjacent airbag to shake.

In other words, the inflation chamber of the window airbag is crushed from a state where the volume as the internal pressure P1 at the start of inflation is V1 to the volume of V2, and if the internal pressure at this time is made lower than P2 that is the equivalent of the internal pressure of the adjacent window airbag, that is, if the volume to which the window airbag is crushed at this time is decreased, shaking in the adjacent airbag is basically suppressed.

Therefore, when Boyle's law is used taking atmospheric pressure into consideration, (atmospheric pressure+P1) #times V1=(atmospheric pressure+P2) #times V2 is satisfied, and the volume V2 at this time is V2=V1 #times (atmospheric pressure+P1)/(atmospheric pressure+P2) (these are the conversion formulae for V2).

The volume reduction rate VR by which the initial volume V1 is reduced to the volume V2 is (V1−V2)/(V1) #times 100 (%), and if V2 in the formula is substituted with the above conversion formula (V1−V2)/(V1) #times 100=[V1−{V1 #times (atmospheric pressure+P1)/(atmospheric pressure+P2)}]/(V1) #times 100=[1−{(atmospheric pressure+P1)/(atmospheric pressure+P2)}] #times 100 (%) is satisfied.

That is, if the volume reduction rate VR is reduced than the above-described conditions, it is possible to make the internal pressure of the inflation chamber lower than P2 that is the equivalent to the internal pressure of the adjacent airbag, and it is possible to favorably suppress shaking in the adjacent airbag.

The volume reduction rate VR has the adjacent airbag not shaking as a condition. That is, for the volume reduction rate VR, in other words, it is possible to obtain a wrap amount Wr between the inflation chamber and the adjacent airbag, and if made the wrap amount Wr with a range with a lower limit or more in which the contact between both airbags is the conditions, and a value of the conditional expression [1−{(atmospheric pressure+P1)/(atmospheric pressure+P2)}] #times 100 (%) or less, it is possible to favorably suppress shaking in the adjacent airbag, and it is possible for the adjacent airbag to receive the occupant with a predetermined receiving surface.

Accordingly, in the occupant protection apparatus of the invention, if the wrap amount (also referred to as the volume reduction rate of the inflation chamber) between the window airbag and the adjacent airbag is set with the conditions of the internal pressure in the above-described A and a value of the conditional expression in the above-described B or less, it is possible to favorable suppress shaking in the adjacent airbag even if the window airbag is inflated coming into contact with the adjacent airbag.

It should be noted that the wrap amount is a design value, and specifically, as a vehicle mounted state, is designed for when each of the window airbag and the adjacent airbag are independently inflated. Whichever proportion of the volume at the site at which the inflation chamber of the window airbag and the adjacent airbag overlap each other three-dimensionally that is modeled with respect to the volume of the entire inflation chamber when inflation is completed becomes the wrap amount. If the designed wrap amount increases deviating from the above value, the disposition or volume of the inflation chamber of the window airbag of the first airbag device or the adjacent airbag of the second airbag device may be redesigned so that the inflation chamber shifts to the vehicle outside or the adjacent airbag shifts to the vehicle inside so that the volume overlapping with the adjacent airbag in the inflation chamber decreases.

In the occupant protection apparatus according to the invention, the adjacent airbag of the second airbag device is formed as an airbag for a passenger seat that is capable of protecting an occupant (specifically, the passenger seat occupant) seated in the passenger seat, that is accommodated folded in a position in front of the passenger seat, that expands and inflates to the rearward side from the accommodation position during inflow of the inflation gas, and that contacts the inflation chamber on the front end side of the window airbag for which inflation is completed.

Alternatively, in the occupant protection apparatus according to the invention, the adjacent airbag of the second airbag device is formed as an airbag for a driver seat that is capable of protecting an occupant (specifically, the driver seat occupant) seated in the driver seat, that is accommodated folded in a position in front of the driver seat, that expands and inflates to the rearward side from the accommodation position during inflow of the inflation gas, and that contacts the inflation chamber on the front end side of the window airbag for which inflation is completed.

The inflation chamber on the front end side of the window airbag is, specifically, as follows. That is, first, the window airbag is formed including a gas inflow portion that causes the inflation gas to flow in and inflates so that the vehicle inside wall portion and the vehicle outside wall portion separate and a non-inflow portion that causes the vehicle inside wall portion and the vehicle outside wall portion to be joined and does not allow inflation gas to flow in. The non-inflow portion includes a peripheral edge portion that forms an outer peripheral edge of the gas inflow portion and a closing portion that divides the gas inflow portion into a plurality of inflation portions.

The inflation chamber of the window airbag is surrounded by an upper edge, lower edge and front edge in the peripheral edge portion and a boundary closing portion as the closing portion that divides a front edge side of a main inflation portion of the gas inflow portion that inflates by inflation gas flowing in, and is provided as an end side inflation portion of the front end side of the window airbag that is a downstream side of the inflation gas of the main inflation portion.

The window airbag may be formed including a tension cloth that supports the vehicle outside of the end side inflation portion, that attaches the front end to a pillar portion of the front edge of the window, and that causes the rear end to be joined to the boundary closing portion.

BRIEF DESCRIPTION OF THE DRAWINGS

FIG. 7 is a schematic transverse cross-sectional view of the front end portion of a window airbag during operation of the occupant protection apparatus of the second embodiment.

DESCRIPTION OF THE PREFERRED EMBODIMENTS

Preferred embodiments of the present invention are described below with reference to the accompanying drawings. However, the invention is not limited to the embodiment disclosed herein. All modifications within the appended claims and equivalents thereto are intended to be encompassed in the scope of the claims.

Figure 1:
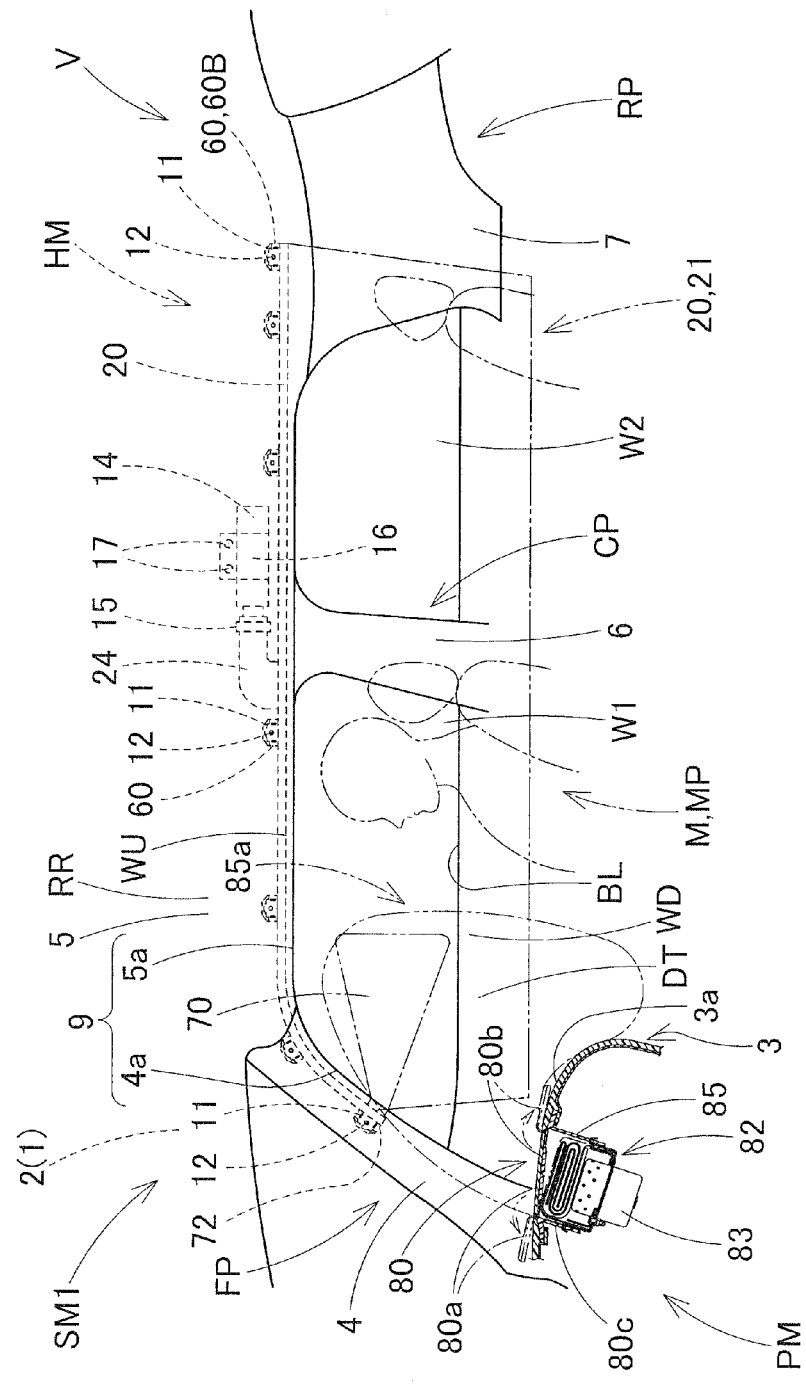
FIG. 1 is a schematic view of a window airbag device and an adjacent airbag device of an occupant protection apparatus of a first embodiment of the invention when viewed from the vehicle inside.

An occupant protection apparatus SM1 of a first embodiment is mounted in a four seat-type left hand drive vehicle V having two windows (side windows) W1 and W2 as illustrated in FIG. 1, and is formed provided with a head protection airbag device HM as a first airbag device having a window airbag 20 and a passenger airbag device PM as a second airbag device having an adjacent airbag 85.

Figure 3:
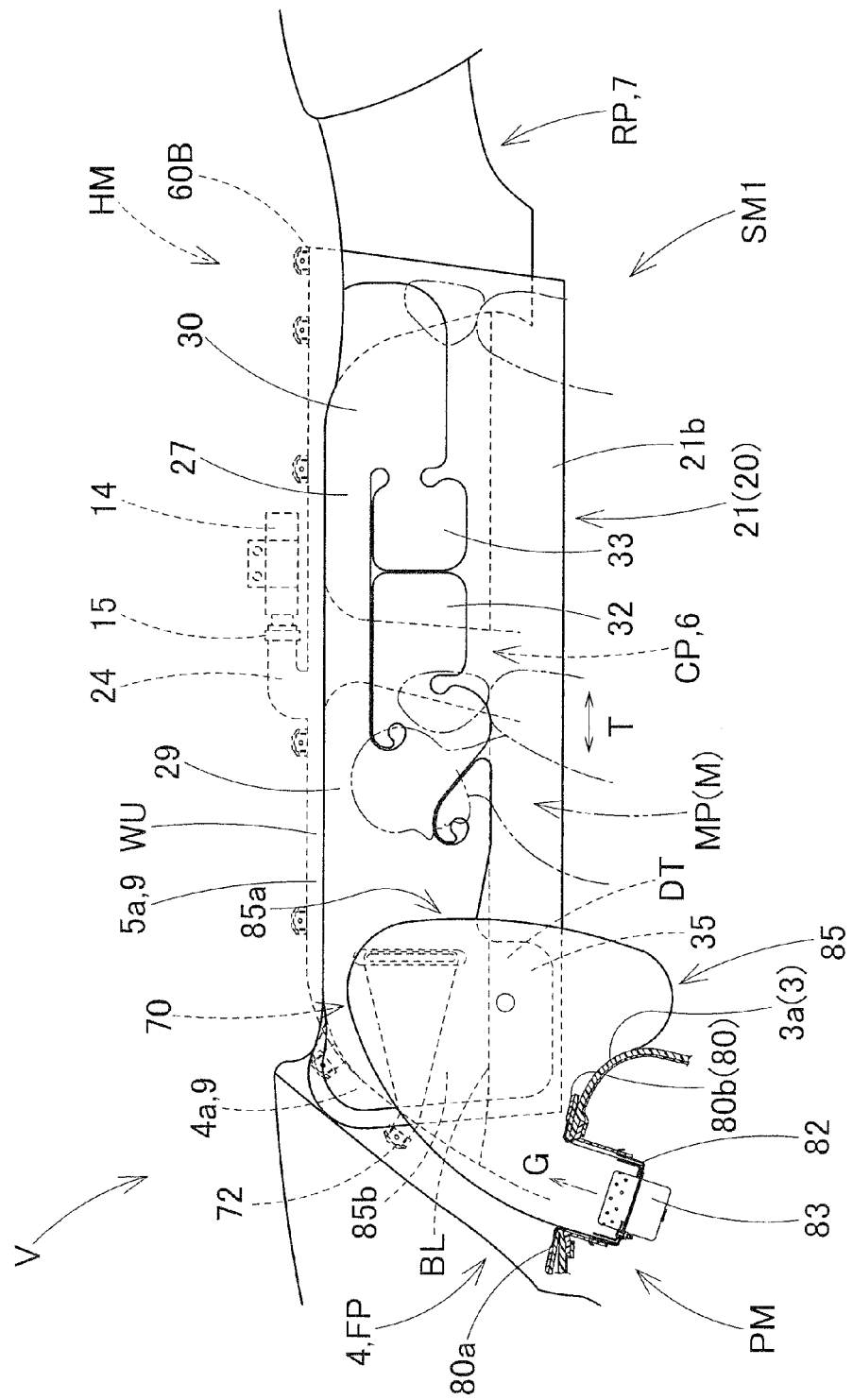
FIG. 3 is a schematic view illustrating the occupant protection apparatus of the first embodiment during operation.

The head protection airbag device (first airbag device) HM is formed provided with a window airbag 20 (below, shortened to airbag 20, for convenience), an inflator 14, attachment brackets 11 and 16, and an airbag cover 9, as illustrated in FIGS. 1 and 3. As illustrated in FIGS. 1 and 3, the airbag 20 is accommodated while being folded on the upper edge side of the windows W1 and W2 on the vehicle inside of the vehicle V, from the lower edge side of a front pillar portion FP as far as the region above a rear pillar portion RP, passing through the lower edge side of a roof side rail portion RR.

As illustrated in FIGS. 1 and 3, the airbag cover 9 is formed from lower edges 4a and 5a of a front pillar garnish 4 disposed on the front pillar portion FP, and a roof head lining 5 disposed on the roof side rail portion RR, respectively. The front pillar garnish 4 and the roof head lining 5 are formed from a synthetic resin, and are attached and fixed to the vehicle inside on an inner panel 2 of a body (car body) 1 side, at the front pillar portion FP and the roof side rail portion RR, respectively. The airbag cover 9 covers the vehicle inside of the airbag 20 that is folded and accommodated, and is formed to be able to open to the vehicle inside while being pushed by the airbag 20 in order to protrude the airbag 20 when expanded and inflated downwards to the vehicle inside (refer to FIGS. 3 and 4).

Since the inflator 14 supplies the inflation gas to the airbag 20, a gas discharge port, not shown, capable of discharging the inflation gas is provided in the tip side as a substantially columnar shaped cylinder type, as illustrated in FIG. 1. The inflator 14 causes the tip side that includes the vicinity of the gas discharge port to be inserted in a connection port portion 24, described later, of the airbag 20, and is connected to the airbag 20 using a clamp 15 disposed on the outer peripheral side of the connection port portion 24. The inflator 14 is attached to a position that is above the window W2 in the inner panel 2 using the attachment bracket 16 that holds the inflator 14, and a bolt 17 for fixing the attachment bracket 16 to the inner panel 2 on the body 1 side. The inflator 14 is electrically connected to a control device, not shown, of the vehicle V via a lead wire, not shown, and is formed to operate by an operation signal from the control device being input when the control device detects a lateral impact or an oblique collision, or a rollover of the vehicle.

Since each attachment bracket 11 is formed from two plates made of sheet metal, each attachment piece portion 60 or attachment portion 72 of the airbag 20 is attached to each attachment piece portion 60 and attachment portion 72 to be pinched from the front and rear, and each attachment piece portion 60 and attachment portion 72 is fixed to the inner panel 2 on the body 1 side using a bolt 12.

The airbag 20 is provided with a bag main body 21, the attachment piece portion 60 fixed to the inner panel 2 of the roof side rail portion RR extending upwards from an upper edge side 21a side of the bag main body 21, and a tension cloth 70 in which the tip (attachment portion) 72 side is fixed to the inner panel 2 of the front pillar portion FP extending from one end side (in the case of the embodiment, front end 21c side) in the front-to-rear direction of the bag main body 21, as illustrated in FIGS. 1 to 4.

Figure 2:
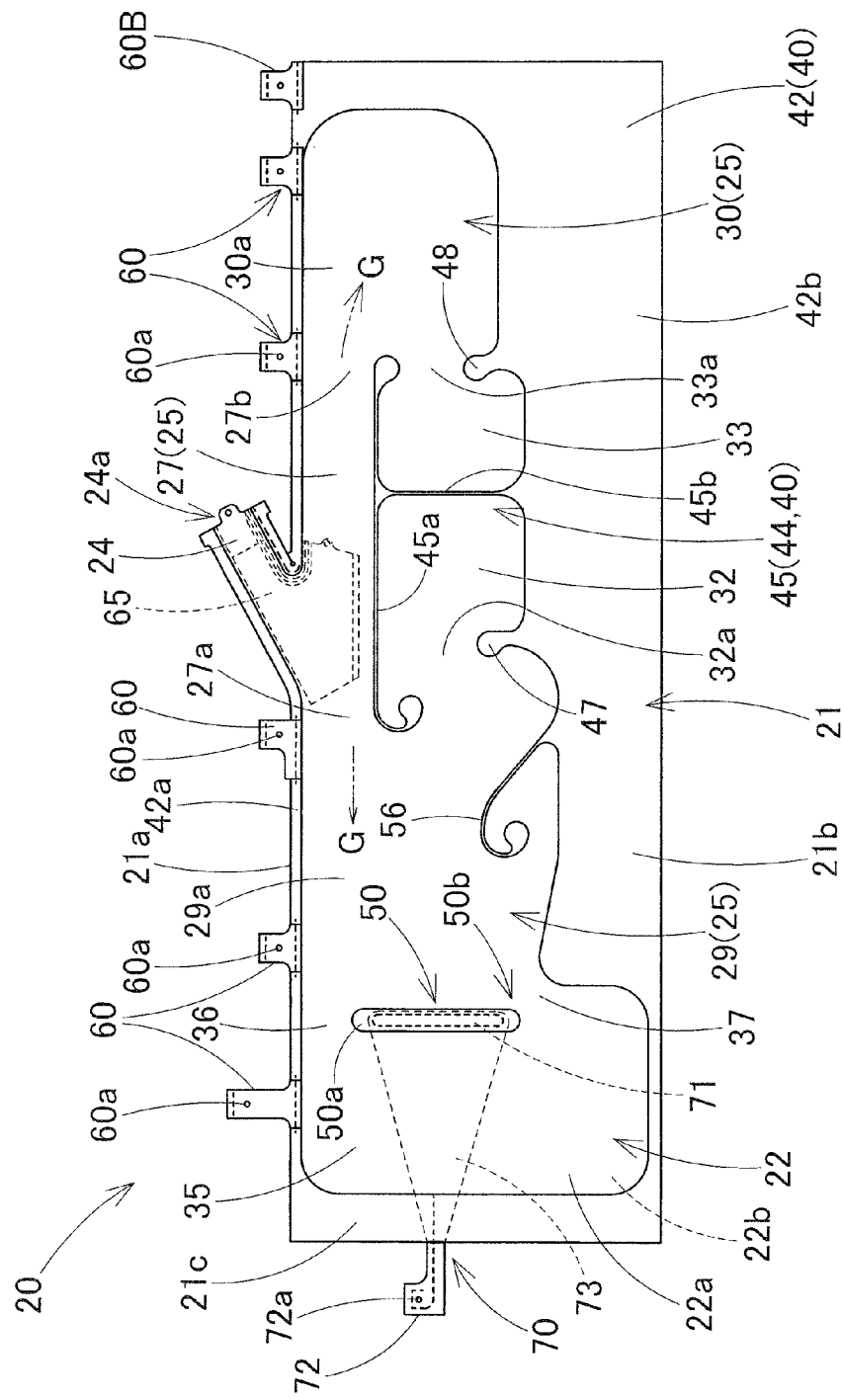
FIG. 2 is a front view of a state in which a window airbag of the first embodiment expands flat.

Since the bag main body 21 is formed so that the inflation gas is caused to flow into the interior from the inflator 14, expands from the folded state, and covers the windows W1 and W2 or the vehicle inside of the pillar garnishes 4, 6, and 7 of each pillar portion FP, CP, and RP as shown in FIGS. 1 and 3, the external shape is formed in a substantially rectangular plate shape in which the long direction substantially follows the front-to-rear direction to be able to cover the vehicle inside from the window W1 to the front side of the rear pillar portion RP passing through the center pillar portion CP and the window W2 when inflation is completed (refer to FIG. 2).

Figure 4:
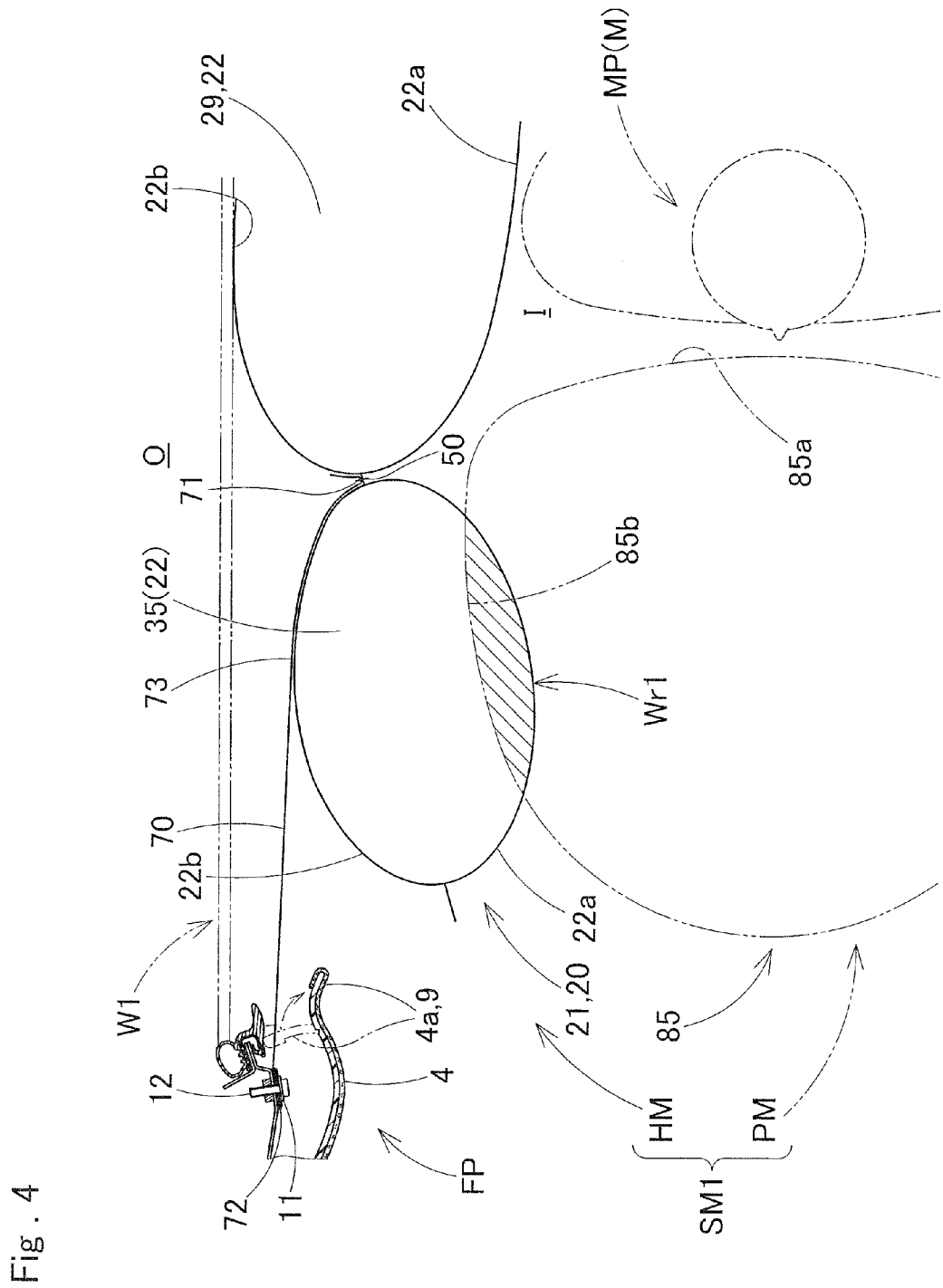
FIG. 4 is a schematic transverse cross-sectional view of a front end portion of the window airbag during operation of the occupant protection apparatus of the first embodiment.

In the case of the embodiment, the bag main body 21 is manufactured by a woven bag using polyamide yarn, polyester yarn, or the like. As illustrated in FIGS. 2 and 4, the bag main body 21 includes a gas inflow portion 22 that performs inflation by causing a inflation gas G to flow into the interior so that a vehicle inside wall portion 22a positioned on a vehicle inside I when inflation is completed and a vehicle outside wall portion 22b positioned on a vehicle outside O are caused to separate, and a non-inflow portion 40 that does not allow the inflation gas to flow in by causing the vehicle inside wall portion 22a and the vehicle outside wall portion 22b to be joined.

The gas inflow portion 22 is formed including the cylindrical connection port portion 24 in which an opening 24a in which the inflator 14 is inserted is provided on the rear end, and a protection inflation portion 25 that inflates to be thick due to the inflation gas that flows in through the connection port portion 24. The protection inflation portion 25 is formed including a supply path portion 27, main inflation portions 29 and 30, sub-inflation portions 32 and 33, and an end side inflation portion 35.

The supply path portion 27 is provided to follow the front-to-rear direction communicating with the connection port portion 24 in the vicinity of the center in the front-to-rear direction on the upper edge 21a side of the bag main body 21 so that the inflation gas G flows to both the front and rear side from the connection port portion 24.

The main inflation portion 29 is the front main inflation portion 29 that communicates an upper portion 29a side with a front end 27a of the supply path portion 27, is disposed to cover the window W1 when inflation completes, and is a site for protecting the head of an occupant (not only the occupant of the passenger seat, but also the driver seated in the driver seat) seated in the front seat. The main inflation portion 30 is the rear main inflation portion 30 that communicates a rear end 27b of the supply path portion 27 with an upper portion 30a side, is disposed to cover the window W2 when inflation completes, and is a site for protecting the head of an occupant seated in the rear seat.

The sub-inflation portion 32 is the front sub-inflation portion 32 that is disposed on the rear side of the front main inflation portion 29, and that inflates by the inflation gas G from the front main inflation portion 29 being caused to flow in by means of an inflow port 32a. The sub-inflation portion 33 is the rear sub-inflation portion 33 that is disposed on the front side of the rear main inflation portion 30, and that inflates by the inflation gas G from the rear main inflation portion 30 being caused to flow in by means of an inflow port 33a. The sub-inflation portions 32 and 33 cause the inflation gas G to flow in from the main inflation portions 29 and 30 when the main inflation portions 29 and 30 receive the occupant and perform a function as a pressure adjusting chamber that suppress a sudden rise in the internal pressure of the main inflation portions 29 and 30.

The end side inflation portion 35 is disposed on the end portion side in the front-to-rear direction of the bag main body 21 adjacent to the front main inflation portion 29, that is on the front end 21c side, and is formed in a substantially rectangular shape extending in the vertical direction. The end side inflation portion 35 is disposed closer to the downstream side of the inflation gas G than the front main inflation portion 29 to be inflated by the inflation gas G being caused to flow in from the front main inflation portion 29 through upper and lower flow ports 36 and 37. The end side inflation portion 35 is disposed to cover the vehicle inside I from the front portion side of the window W1 over the front pillar portion FP when inflation completes. Furthermore, the end side inflation portion 35 is formed so that the lower edge side when inflation completes extends further downward than a belt line BL on a lower edge WD side of the window W1 and is supported by a door trim DT as a car body side member on the lower edge WD side of the window W1.

Figure 6:
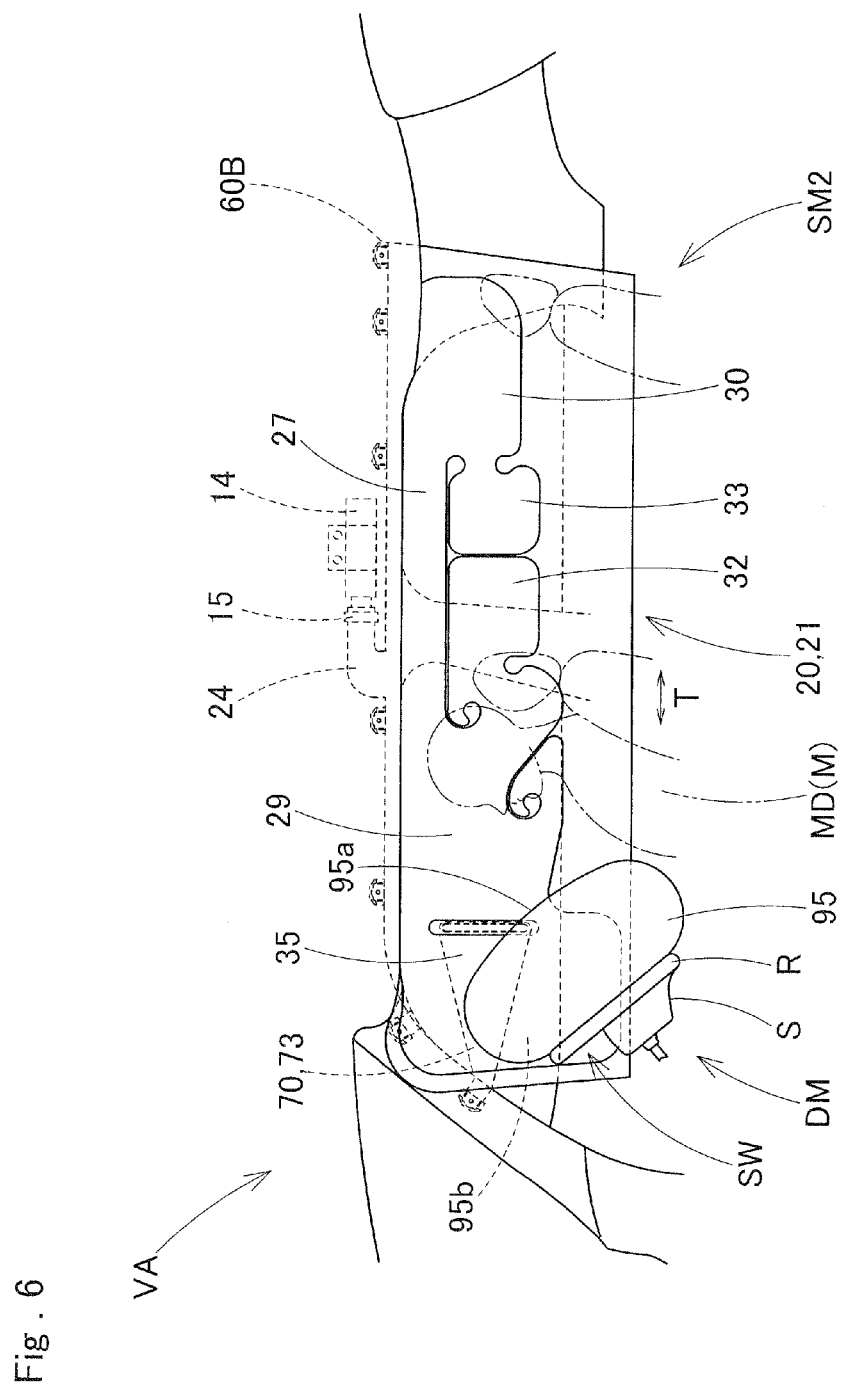
FIG. 6 is a schematic view illustrating the occupant protection apparatus of the second embodiment during operation.

A separate trident-like inner tube 65 for increasing heat resistance is provided on an inside site in the vicinity of the connection port portion 24 in the supply path portion 27 from the connection port portion 24 of the bag main body 21 (refer to FIGS. 2 and 6).

The non-inflow portion 40 is formed including a peripheral edge portion 42 that forms the outer peripheral edge of the gas inflow portion 22, and a closing portion 44 that is disposed in order to regulate the thickness of the protection inflation portion 25 as an inflation site of the gas inflow portion 22 or divide the protection inflation portion 25.

The peripheral edge portion 42 is disposed to surround entirety of the periphery of the gas inflow portion 22 excepting the opening 24a on the rear end of the connection port portion 24.

The closing portion 44 is formed including a central closing portion 45, a central front closing portion 47, a center rear closing portion 48, a boundary closing portion 50, and a thickness regulating closing portion 56. The central closing portion 45 divides the supply path portion 27 and the sub-inflation portions 32 and 33. The central closing portion 45 is provided in a T-shape in which a horizontal bar portion 45a and a vertical bar portion 45b are provided. The vertical bar portion 45b extends upward from the vicinity of the center in the front-to-rear direction of a lower edge 42b of the peripheral edge portion 42, and divides the front sub-inflation portion 32 and the rear sub-inflation portion 33. The horizontal bar portion 45*a* extends to both the front and rear sides at the upper end of the vertical bar portion 45*b,* and divides the supply path portion 27 and the front and rear sub-inflation portions 32 and 33 at the lower edge side of the supply path portion 27.

The central front closing portion 47 divides the front sub-inflation portion 32 and the front main inflation portion 29. The central front closing portion 47 is disposed to extend linearly obliquely upwards from the site of the lower edge 42*b* of the peripheral edge portion 42 obliquely below the rear of the inflow port 32*a* to form the inflow port 32*a* between the front end of the horizontal bar portion 45*a* of the central closing portion 45. The central rear closing portion 48 divides the rear sub-inflation portion 33 and the rear main inflation portion 30. The central rear closing portion 48 is disposed to extend linearly upwards from the site of the lower edge 42*b* of the peripheral edge portion 42 directly below the inflow port 33*a* to form the inflow port 33*a* between the rear end of the horizontal bar portion 45*a* of the central closing portion 45.

The thickness regulating closing portion 56 is disposed to proceed from the lower edge 42*b* of the peripheral edge portion 42 below the front main inflation portion 29 to inside the front main inflation portion 29 so as to regulate the thickness of the front main inflation portion 29.

The boundary closing portion 50 is provided between the front main inflation portion 29 and the end side inflation portion 35, and divides the front main inflation portion 29 and the end side inflation portion 35. The boundary closing portion 50 is provided separating both upper and lower ends 50*a* and 50*b* from the upper edge 42*a* or lower edge 42*b* of the peripheral edge portion 42, and provided with the flow ports 36 and 37 in which the inflation gas G from the front main inflation portion 29 is able to flow to the end side inflation portion 35 side between the upper edge 42*a* side and the lower edge 42*b* side, respectively.

The attachment piece portion 60 is a site for attaching the upper edge 21*a* side of the bag main body 21 to the inner panel 2 on the body 1 side of the vehicle V, and is disposed at a plurality of locations (in the embodiment, six locations) along the front-to-rear direction to protrude upwards from the upper edge 21*a* of the bag main body 21. In this case of the embodiment, the attachment piece portion 60 is formed from a woven cloth formed of polyamide yarn, polyester yarn or the like, similarly to the bag main body 21, as a separate body from the bag main body 21, and is provided with the wide lower end side sewn to the upper edge 21*a* of the bag main body 21 using suturing yarn, and an attachment hole 60*a* into which the attachment bolt 12 is inserted is provided on the upper end side.

The tension cloth 70 is formed from a sheet material having flexibility. In the case of the embodiment, the tension cloth 70 is formed from a woven cloth formed of polyamide yarn, polyester yarn, or the like. As illustrated in FIGS. 2 and 3, the tension cloth 70 is disposed on the vehicle outside O of the end side inflation portion 35 when inflation of the bag main body 21 is completed, and the rear end portion 71 side that is the origin portion side is joined to the boundary closing portion 50 by means of stitching. In the case of the embodiment, the external shape of the tension cloth 70 is formed in a substantially triangular plate shape in which a rear end portion 71 is the base, as illustrated in FIGS. 3 and 6, and an attachment hole 72*a* is provided in the front end portion 72 that is the tip portion side. The tension cloth 70 is formed to cover the vehicle outside O of the region of the intermediate site in the vertical direction of the end side inflation portion 35 by means of an intermediate portion 73 between the rear end portion 71 and the front end portion 72.

The front end portion 72 of the tension cloth 70 forms the attachment portion that is fixed to the position of the inner panel 2 on the body 1 side at the site of the front pillar portion FP on the forward side of the end side inflation portion 35, and the front end portion 72 is fixed to the inner panel 2 using the attachment bracket 11 and the attachment bolt 12, similarly to the attachment piece portion 60, and is provided with an attachment hole 72*a* in which the attachment bolt 12 is able to be inserted.

In the bag main body 21 of the embodiment, when inflation is completed when mounted in a vehicle, the protection inflation portion 25 inflates to contract the width dimension in the front-to-rear direction from the non-inflated state, and a tension T that substantially follows the front-to-rear direction is generated, as illustrated in FIG. 3, between the front end portion 72 disposed on the tip side of the tension cloth 70 and an attachment piece portion 60B disposed on the rear end side of the bag main body 21.

In the case of the embodiment, in a state where the tension cloth 70 supports the vehicle outside O of the end side inflation portion 35, a wrap amount Wr1 in which the end side inflation portion 35 when inflation is completed overlaps the passenger seat airbag 85, described later, during inflation, and is formed, in terms of design, as approximately 12% of a volume V1 during inflation of the end side inflation portion 35 as an inflation chamber divided by the boundary closing portion 50. It should be noted that, in practice, if the end side inflation portion 35 when inflation is completed comes in contact with the passenger seat airbag 85, described later, during inflation, even through the end side inflation portion 35 is mainly recessed, the passenger seat airbag 85 is also in a slightly recessed state.

Mounting of the head protection airbag device HM to the vehicle V is accomplished by folding using roll folding or accordion folding so that the airbag 20 in which the attachment piece portion 60 and the tension cloth 70 are sewn to the bag main body 21 expands flat, and the lower edge 21*b* of the bag main body 21 approaches the upper edge 21*a* side while the tension cloth 70 is wrapped. The attachment bracket 11 is attached to the attachment portion 72 or the attachment piece portion 60 wrapped in a breakable wrapping material so that folding collapse does not occur, and the inflator 14 to which the attachment bracket 16 is attached is connected to the connection port portion 24 of the bag main body 21 using the clamp 15. If the attachment brackets 11 and 16 are disposed at a predetermined position on the inner panel 2 on the body 1 side, the bolts 12 and 17 are fixed, a lead wire, not shown, that extends from a control device for a predetermined inflator operation is electrically connected to the inflator 14, the front pillar garnish 4 or the roof head lining 5 is attached to the inner panel 2 on the body 1 side, and the pillar garnishes 6 and 7 are further attached to the inner panel 2 on the body 1 side, it is possible to mount the head protection airbag device HM to the vehicle V.

The passenger seat airbag device PM as the second airbag device is formed including the passenger seat airbag 85 as the adjacent airbag (below, simplified to airbag 85, for convenience) that inflates to be able to protect an occupant M (MP) as a top mount type mounted to the upper surface 3*a* side of the instrument panel (below, simplified to panel, for convenience) 3 in front of the passenger seat, an inflator 83 that supplies the inflation gas G of the airbag 85, a case 82 that accommodates and holds the folded airbag 85 and the inflator 83, and an airbag cover 80 that covers the folded airbag 85.

The airbag cover 80 is integrally formed with the panel 3 from a synthetic resin, in the case of the embodiment, and is formed including door portions 80a and 80b that open to both the front and rear sides when pushed by the airbag 85 during inflation, and a square cylinder-shaped side wall portion 80c that extends downward from the peripheral edge of the door portions 80a and 80b.

The case 82 as an accommodation site that accommodates the folded airbag 85 is formed by a metal plate, in a rectangular parallelepiped shape having a square cylinder-shaped peripheral wall portion (not shown) that is opened upward and a bottom wall portion (not shown), holds the airbag 85 and the inflator 83 on the bottom wall portion side, and is supported in the bracket, not shown, that extends from the panel reinforcement of the vehicle V. A hook (not shown) that engages the side wall portion 80c of the airbag 80 is formed in the peripheral wall portion of the case 82.

As an inflation completed shape, the airbag 85 has a substantially square pyramid shape whose front end is narrowed and whose rear surface side serves as a receiving intended surface 85a for the occupant MP, and the side surface 85b side on the vehicle outside O (window W1 side) serves as a site that comes into contact to interfere with the end side inflation portion 35 of the window airbag 20.

Mounting of the passenger seat airbag device PM to the vehicle V is performed by folding the airbag 85 accommodating an attachment jig (retainer) to the case 82 in the interior, mounting on the bottom wall portion of the case 82, inserting the inflator 83 from below the bottom wall portion of the case 82, and attaching and fixing the airbag 85 and the inflator 83 to the bottom wall portion of the case 82 using the attachment jig. If the peripheral wall portion of the case 82 is connected to the side wall portion 80c of the airbag cover 80 extending from the panel 3 using the predetermined hook, the panel 3 is attached to the interior of the vehicle, and the case 82 is held in the predetermined bracket extending from the instrument panel reinforcement, and a lead wire that extends from the control device by which the airbag device PM is caused to operate is further connected to the inflator 83, it is possible to mount the passenger seat airbag device PM to the vehicle.

After mounting of the head protection airbag device HM and the passenger seat airbag device PM to the vehicle V, during a side surface impact, oblique impact or during rollover of the vehicle V, an operation signal is received from the control device, thereby causing the inflator 14 to operate, the window airbag 20 inflates due to the inflation gas G discharged from the inflator 14, pushes open the airbag cover 9 formed from the lower edges 4a and 5a of the front pillar garnish 4 and the roof head lining 5, and inflates greatly to cover the vehicle inside I of the windows W1 and W2, the front pillar portion FP, the center pillar portion CP, and the rear pillar RP, while protruding downward, as illustrated by the double dotted and dashed line in FIG. 1 or in FIGS. 3 and 4.

In an oblique impact in the vehicle V at this time, for example, the passenger seat airbag device PM also receives the operation signal from the control device, the inflator 83 is operated, and the passenger seat airbag 85 inflates by means of the inflation gas G discharged from the inflator 83, pushes open the door portions 80a and 80b of the airbag cover 80, expands and inflates to the rear side from the case 82 as the accommodation site, causes the receiving intended surface 85a on the rear surface side to be positioned to face the occupant MP, and inflates greatly.

At this time, in the first embodiment, for the window airbag 20 and the passenger seat airbag 85, the vehicle inside wall portion 22a of the end side inflation portion 35 as the inflation chamber of the window airbag 20 and the side surface 85b of the passenger seat airbag 85 come into contact as illustrated in FIG. 4.

However, in the first embodiment, the wrap amount Wr1 of the end side inflation portion 35 with the passenger seat airbag 85 as the adjacent airbag is set in advance to approximately 12%.

In the first embodiment, a state is attained in which the end side inflation portion 35 as the inflation chamber of the window airbag 20 during inflation reaches an internal pressure P1 of 30 kpa after 30 ms from the operation start, the passenger seat airbag 85 during inflation reaches an internal pressure P2 of 50 kpa after 30 ms from the operation start, and the end side inflation portion 35 and the passenger seat airbag 85 as the adjacent airbag interfere with each other after 30 ms after the operation start for both. The volume V1 of the end side inflation portion 35 is made 9 liters.

That is, in the first embodiment, the internal pressure P2 of the adjacent airbag 85 is greater than the internal pressure P1 of the inflation chamber 35 of the window airbag 20, and P1<P2 is satisfied (the condition A, described above, is satisfied). The wrap amount Wr1 of the inflation chamber 35 with the adjacent airbag 85 is 12% of a value of [1−{(atmospheric pressure+P1)/(atmospheric pressure+P2)}] #times 100 (%) of the previously described conditional expression B or less, within a range in which the contact state with the adjacent airbag 85 of the window airbag 20 is maintained.

That is, when numerical values are entered into the conditional expression B, if the atmospheric pressure is 101 kpa, [1−{(101+30)/(101+50)}] #times 100 (%)=13.2% is satisfied, and a lower wrap amount Wr1 of 12% is set.

Incidentally, the wrap amount of 13.2% becomes, if the volume of the volume V1 (nine liters) is crushed and the volume after change becomes V2, according to Boyle's law, ((atmospheric pressure+30) #times V1)=((atmospheric pressure+50) #times V2), and becomes V2=[{(101+30) #times 9/(101+50)=7.81 liters.

In other words, if the end side inflation portion 35 as the inflation chamber is reduced to 87% of the volume change rate (reaches 7.81/9=0.87) until 7.81 liters at which the volume V1 (9 liters) becomes the volume V2 (13.2% as the wrap amount), the value of the conditional expression B is reached, and in the embodiment, is approximately 12% of the value or less.

Therefore, in the embodiment, the passenger seat airbag 85 as the adjacent airbag suppresses shaking such as shifting of the receiving intended surface 85a, and may favorably receive the occupant MP.

Accordingly, in the occupant protection apparatus SM1 of the embodiment, as the conditions of the internal pressure in the above-described A and the value or less of the conditional expression of the above-described B, the wrap amount Wr1 between the airbag 20 as the window airbag and the passenger seat airbag 85 as the adjacent airbag is set, and even if the airbag 20 inflates coming into contact with the airbag 85, it is possible to favorably suppress shaking of the airbag 85, and it is possible for the passenger seat airbag 85 to accurately receive and protect the occupant MP with the receiving intended surface 85a.

It should be noted that if the wrap amount Wr1 set as above deviates greatly from the value of the conditional expression of the above-described B, this is addressed to reduce the volume by which the end side inflation portion 35 as the inflation chamber and the passenger seat airbag 85 overlap. In this case, for example, this may be addressed by redesigning the arrangement or volume of the end side inflation portion 35 or the airbag 85 so that the end side inflation portion 35 is shifted to the vehicle outside O or the passenger seat airbag 85 as the adjacent airbag is shifted to the vehicle inside I. Incidentally, in the airbag 20 of the embodiment, the length dimension in the front-to-rear direction of the tension cloth 70 that supports the vehicle outside O of the end side inflation portion 35 may be increased. This is because it is possible for the tension cloth 70 to weaken the support force with which the end side inflation portion 35 is pushed to the vehicle inside I, and it is possible to shift the end side inflation portion 35 to the vehicle outside O.

Naturally, if the wrap amount Wr1 set as above is excessively small, the wrap amount Wr1 may be increased so that the end side inflation portion 35 pushes into the vehicle inside I within the range of the conditional expression of the above B. In this case, if the end side inflation portion 35 is disposed to be shifted to the vehicle inside I by shortening the length dimension in the front-to-rear direction of the tension cloth 70, it is possible to increase the wrap amount Wr1. Naturally, in the configuration of the airbag 20 in which the end side inflation portion 35 is shifted to protrude to the vehicle inside I, it is possible for the end side inflation portion 35 to favorably receive an occupant that is moving obliquely forward to the vehicle outside O. Alternatively, the passenger seat airbag 85 as the adjacent airbag shifts to the vehicle outside O, and the wrap amount Wr1 may increase.

Figure 5:
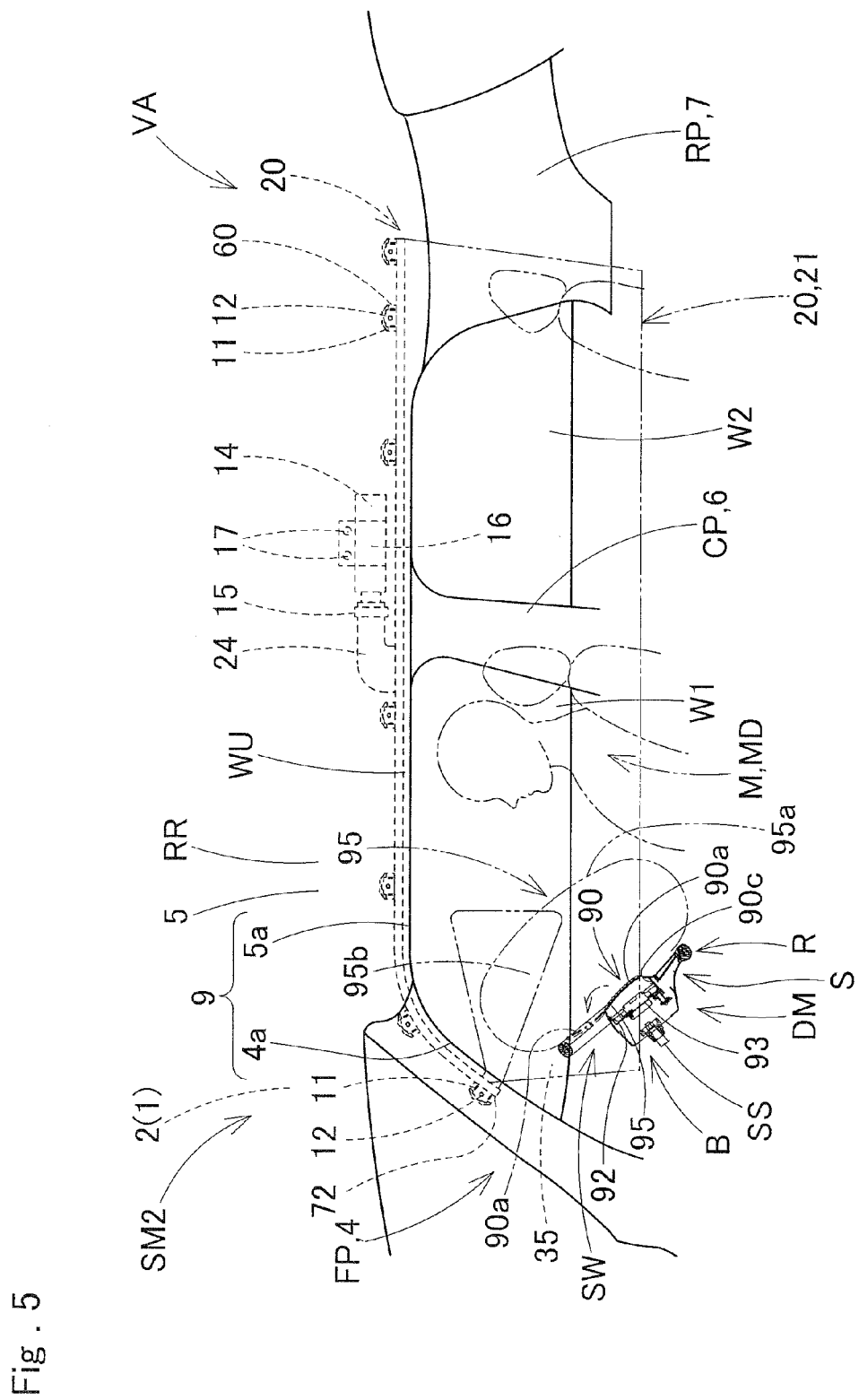
FIG. 5 is a schematic view of a window airbag device and an adjacent airbag device of an occupant protection apparatus of a second embodiment when viewed from the vehicle inside.

An occupant protection apparatus SM2 of a second embodiment is mounted to a right-hand drive vehicle VA and protects a driver MD as the occupant M as illustrated in FIGS. 5 to 7, and is formed including the same head protection airbag device HM as the first embodiment, and a driver seat airbag device DM mounted to a steering wheel SW disposed in front of the driver seat.

The head protection airbag device HM is the same as that of the first embodiment, and in the second embodiment the same references as the first embodiment are applied, and description thereof will not be repeated.

The driver seat airbag device DM is provided on the upper portion side on a boss portion B in the center of a ring portion R grasped during steering with the steering wheel SW. The steering wheel SW is formed including the annular ring portion R that is grasped during steering, a boss portion B that is disposed in the center of the ring portion R and connected to a steering shaft SS, and a plurality of spoke portions S that link the ring portion R and the boss portion B.

The driver seat airbag device DM of the upper portion of the boss portion B is formed including an airbag 95 as the adjacent airbag, an inflator 93 that supplies the inflation gas G to the airbag 95, a case 92 that accommodates and holds the folded airbag 95 and the inflator 93, and an airbag cover 90 as a pad disposed on the upper surface side of the boss portion B.

The airbag 90 is provided with a door portion 90a that is made from a synthetic resin and pushed open forward during inflation of the airbag 95, and provided with a square cylinder-shaped side wall portion 90c that extends downward from the peripheral edge of the door portion 90a.

The case 92 is formed in a parallelepiped shape that is opened upward in which the airbag 95 and the inflator 93 are attached and fixed to the bottom wall portion, and is held to a predetermined core site of the steering wheel SW.

As an inflation completed shape, the airbag 95 as an adjacent airbag has an elliptical shape whose rear surface side serves as the receiving intended surface 95a for receiving the driver MD, and the side surface 95b on the vehicle outside O (window W1 side) serves as a site that comes into contact with the end side inflation portion 35 as the inflation chamber.

In the occupant protection apparatus SM2, a state is attained in which the end side inflation portion 35 as the inflation chamber of the window airbag 20 during inflation reaches an internal pressure P1 of 30 kpa after 30 ms from the operation start, the driver seat airbag 95 during inflation reaches an internal pressure P2 of 50 kpa after 30 ms from the operation start, and the end side inflation portion 35 and the driver seat airbag 95 as the adjacent airbag interfere with each other after 30 ms from the operation start for both, and a wrap amount Wr2 of the end side inflation portion 35 with the window airbag 95 during contact is 12%. The volume V1 of the end side inflation portion 35 is made 9 liters.

That is, in the first embodiment, the internal pressure P2 of the adjacent airbag 95 is greater than the internal pressure P1 of the inflation chamber 35 of the window airbag 20, and P1<P2 is satisfied (the condition A, described above, is satisfied).

The wrap amount Wr2 of the inflation chamber 35 with the adjacent airbag 85 is 12% of a value of [1−{(atmospheric pressure+P1)/(atmospheric pressure+P2)}] #times 100 (%) of the previously described conditional expression B or less, within a range in which the contact state with the adjacent airbag 85 of the window airbag 20 is maintained.

That is, when numerical values are entered into the conditional expression B, if the atmospheric pressure is 101 kpa, [1−{(101+30)/(101+50)}] #times 100 (%) =13% is satisfied, and a lower wrap amount Wr2 of 12% is set.

Therefore, in the occupant protection apparatus SM2 of the second embodiment, as the conditions of the internal pressure in the above-described A and the value or less of the conditional expression of the above-described B, the wrap amount Wr2 between the airbag 20 as the window airbag and the driver seat airbag 95 as the adjacent airbag is set, and even if the airbag 20 inflates coming into contact with the airbag 95, it is possible to favorably suppress shaking of the airbag 95, and it is possible for the driver seat airbag 95 to accurately receive and protect the occupant MD with the receiving surface 95a.

It should be noted that, in the embodiments, although the airbag 20 with a configuration in which the end side inflation portion 35 as the inflation chamber is disposed on the front end side 21c of the bag main body 21 is described as an example, the arrangement and position of the inflation chamber are not limited to those in the embodiments, as long as the site comes in contact with the adjacent airbag, the site becomes the inflation chamber.

As long as the adjacent airbag is an airbag that completes inflation to contact the window airbag, there is no limitation to the passenger seat airbag 85 or the driver seat airbag 95 as in the embodiments, and the adjacent airbag may be an airbag of a side airbag device mounted in the seat, and various side airbags and the like can be applied as the second airbag device in addition to the passenger seat airbag device and the driver seat airbag device.

What is claimed is:

1. An occupant protection apparatus comprising:
   a first airbag device including a window airbag that is folded and accommodated on an upper edge side of a window on a vehicle inside of the vehicle, and expands and inflates downwards to cover the vehicle inside of the window during inflow of an inflation gas thereby protecting an occupant; and
   a second airbag device that including an adjacent airbag is provided in the vicinity of the first airbag device, and that, during operation, protects the occupant by inflation being completed to come in contact with the window airbag for which inflation is completed, wherein the window airbag and the adjacent airbag when inflation is completed are set satisfying conditions of
A. P1<P2, and
B. A wrap amount of the inflation chamber with the adjacent airbag is set satisfying conditions where [1−{(atmospheric pressure+P1)/(atmospheric pressure+P2)}] #times 100 (%) or less within a range in which a contact state between the window airbag and the adjacent airbag is maintained, where an internal pressure of an inflation chamber at the contact site during contact with the adjacent airbag of the window airbag is P1, and an internal pressure of the adjacent airbag during contact with the inflation chamber is P2.

2. The occupant protection apparatus according to claim 1,
wherein the adjacent airbag of the second airbag device is formed as an airbag for a passenger seat that is capable of protecting an occupant seated in the passenger seat, that is accommodated folded in a position in front of the passenger seat, that expands and inflates to the rearward side from the accommodation position during inflow of the inflation gas, and that contacts the inflation chamber on a front end side of the window airbag for which inflation is completed.

3. The occupant protection apparatus according to claim 2,
wherein the window airbag includes
a gas inflow portion that inflates to separate a vehicle inside wall portion and a vehicle outside wall portion while the inflation gas is caused to flow in, and
a non-inflow portion which causes the vehicle inside wall portion and the vehicle outside wall portion to be joined, thereby not allowing the inflation gas to flow in, and
the non-inflow portion includes
a peripheral edge portion that forms an outer peripheral edge of the gas inflow portion, and
a closing portion that divides the gas inflow portion into a plurality of inflation portions and
the inflation chamber of the window airbag is surrounded by an upper edge, lower edge and front edge in the peripheral edge portion and a boundary closing portion as the closing portion that divides a front edge side of a main inflation portion of the gas inflow portion that inflates by inflation gas flowing in, and is provided as an end side inflation portion of the front end side of the window airbag that is a downstream side of the inflation gas of the main inflation portion.

4. The occupant protection apparatus according to claim 3,
wherein the window airbag includes a tension cloth that supports the vehicle outside of the end side inflation portion, that attaches a front end to a pillar portion of the front edge of the window, and causes a rear end to be joined to the boundary closing portion.

5. The occupant protection apparatus according to claim 1,
wherein the adjacent airbag of the second airbag device is formed as an airbag for a driver seat that is capable of protecting an occupant seated in the driver seat, that is accommodated folded in a position in front of the driver seat, that expands and inflates to the rearward side from the accommodation position during inflow of the inflation gas, and that contacts the inflation chamber on a front end side of the window airbag for which inflation is completed.

6. The occupant protection apparatus according to claim 5,
wherein the window airbag includes
a gas inflow portion that inflates to separate a vehicle inside wall portion and a vehicle outside wall portion while the inflation gas is caused to flow in, and
a non-inflow portion which causes the vehicle inside wall portion and the vehicle outside wall portion to be joined, thereby not allowing the inflation gas to flow in, and
the non-inflow portion includes
a peripheral edge portion that forms an outer peripheral edge of the gas inflow portion, and
a closing portion that divides the gas inflow portion into a plurality of inflation portions, and
the inflation chamber of the window airbag is surrounded by an upper edge, lower edge and front edge in the peripheral edge portion and a boundary closing portion as a closing portion that divides a front edge side of a main inflation portion of the gas inflow portion that inflates by inflation gas flowing in, and is provided as an end side inflation portion of the front end side of the window airbag that is a downstream side of the inflation gas of the main inflation portion.

7. The occupant protection apparatus according to claim 6,
wherein the window airbag includes a tension cloth that supports the vehicle outside of the end side inflation portion, that attaches a front end to a pillar portion of the front edge of the window, and causes a rear end to be joined to the boundary closing portion.

* * * * *